United States Patent [19]

Colwill

[11] Patent Number: 4,494,855

[45] Date of Patent: Jan. 22, 1985

[54] SYNCHRONOUS COPYING AND COLLATING SYSTEM

[76] Inventor: Richard H. Colwill, 1007 Hellam St., Monterey, Calif. 93940

[21] Appl. No.: 587,110

[22] Filed: Mar. 7, 1984

[51] Int. Cl.$^3$ .............................................. G03B 27/00

[52] U.S. Cl. .......................................... 355/1; 355/48; 355/50

[58] Field of Search ................................ 355/48, 50, 1

[56] References Cited

U.S. PATENT DOCUMENTS

| | | | |
|---|---|---|---|
| 3,398,669 | 8/1968 | Hicks, Jr. . | |
| 3,580,670 | 5/1971 | Bhagat . | |
| 4,168,900 | 9/1979 | Adachi | 355/50 |
| 4,193,679 | 3/1980 | Mochizuki et al. . | |
| 4,236,814 | 12/1980 | Tonkin . | |
| 4,258,978 | 3/1981 | Cole . | |

FOREIGN PATENT DOCUMENTS

| | | | |
|---|---|---|---|
| 4515897 | 7/1963 | Japan | 355/50 |
| 56-67866 | 6/1981 | Japan | 355/1 |

*Primary Examiner*—Monroe H. Hayes
*Attorney, Agent, or Firm*—Stonebraker, Shepard & Stephens

[57] ABSTRACT

A synchronous copying and collating system 10 uses side-by-side original document and copy paper feed paths having reprographic portions 11 and 20 extending vertically downward. Endless belts 24 and 54 with drive perforations 26 driven by pinwheel drives 34 and 34*c* advance simultaneously at the same speed for moving original paper and copy paper synchronously in a continuous succession through their respective reprographic paths 11 and 20. Endless drive belts have alignment tabs 25 arranged to locate sheet boundaries at predetermined and regular intervals on endless belts to keep originals and copies registered with reprographic reading and imaging devices. These include fiber optic lens arrays 12, 14, 16, and 18 adjacent the original path for reading moving information, optical fibers for transferring the information to the copy paper, and reprographic imaging devices arranged for copying the information onto the moving copy paper.

15 Claims, 9 Drawing Figures

SYNCHRONOUS COPYING AND COLLATING SYSTEM

BACKGROUND

I have devised a better way of moving original documents and copy paper through a reprographic device so that automatically collated copying can occur continuously. My system moves the documents and copy paper synchronously along parallel paths while reprographically transferring information from the originals to the copy paper. My system affords a simple way of copying both sides of originals onto both sides of copy paper. Originals can circulate repeatedly through a reprographic reading path a desired number of times for making automatically collated copies of multi-page documents. My system aims at speed, efficiency, convenience, and economy in affording fast and versatile copying and collating with a machine made simpler than prior art devices.

SUMMARY OF THE INVENTION

My synchronous copying and collating system includes an original document feed path and a copy paper feed path arranged side by side so that each path has a reprographic portion extending vertically downward. Endless belts with drive perforations driven by pinwheel drives advance simultaneously at the same speed for moving original paper and copy paper synchronously in a continuous succession through the reprographic portions of each of the feed paths. The endless drive belts have alignment pegs arranged to locate sheet boundaries at predetermined and regular intervals on the endless belts to keep originals and copies registered with reprographic reading and imaging devices. These include a fiber optic lens array adjacent the original path for reading information moving down the original path, optical fibers for transferring the information to the copy path, and a reprographic imaging device arranged for copying the information onto the copy paper moving down the copy path. A recirculation loop recirculates the original documents past the reader for as many times as necessary to make the desired number of copies.

My system also preferably includes a finishing bench on which collated copies are delivered for finishing operations such as stapling or binding. Copy paper can preferably be replenished during an operating cycle. My system can accommodate a block printer for displaying information blocks sequentially relative to the original documents for copying via the reprographic imaging system.

DRAWINGS

DETAILED DESCRIPTION

Figure 1:
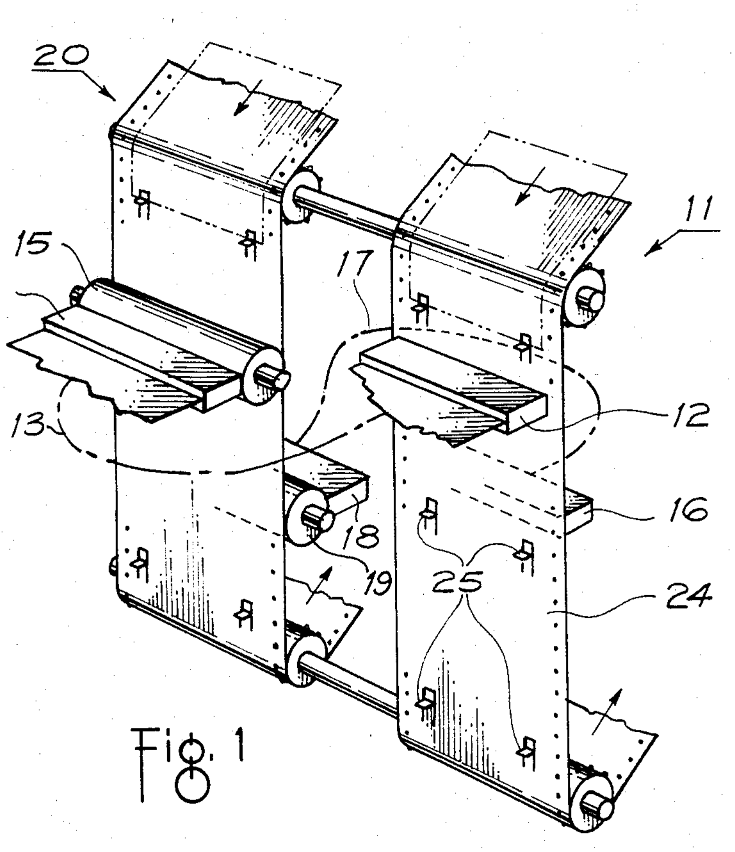
FIG. 1 is a partially schematic, isometric view of preferred original document and copy paper feed paths according to my invention.

My copying and collating system 10 uses side-by-side document and copy paper paths that move continuously and synchronously downward through reprographic legs of the paths as schematically shown in FIG. 1. As original documents move vertically downward on the reprographic portion 11 of their path, a fiber optic lens array 12 reads the information moving by and transmits it instantly via a fiber optic cable 13 to a corresponding fiber optic lens array 14 that images the information onto the drum 15 of an electrostatic copier element on the reprographic portion 20 of the copy paper path. Another fiber optic lens array 16 can be arranged to read the back side of the original document and transfer that information via fiber optic cable 17 to a fiber optic lens array 18 that images the information on another electrostatic drum 19 disposed for copying this onto the back face of the copy paper. The vertical positions of the readers and drums are spaced for registering the information from the originals onto the copies, page for page.

Endless belts drive the originals and copy paper through their respective reprographic paths 11 and 20. To ensure horizontal alignment of the sheet boundaries for originals and copies, the belts have alignment pegs or tabs 25 that locate the originals and copies and keep them synchronously registered with the reading and imaging devices. The alignment tab spacing is preferably 11 inches to accommodate 8½ by 11 inch paper. The tabs are also preferably made thin so that sheets are nearly juxtaposed as they flow down the reprographic paths in a practically unbroken succession.

My system can accommodate different kinds of paper including computer paper, zigzag or X-fold paper, or a stream of discrete sheets. The original documents are preferably fed into the reprographic path by a bottom sheet feeder that deals them from the bottom of a stack. The originals can recirculate through reprographic path 11 for as many times as necessary to make the desired number of copies. When the originals are copied a sufficient number of times, they exit at the bottom of their reprographic path in their original collated order. Copy sheets exit at the bottom of reprographic copy path 20 onto a finishing bench 21 in collated order where they can be easily stapled, bound, or otherwise processed.

Figure 4:
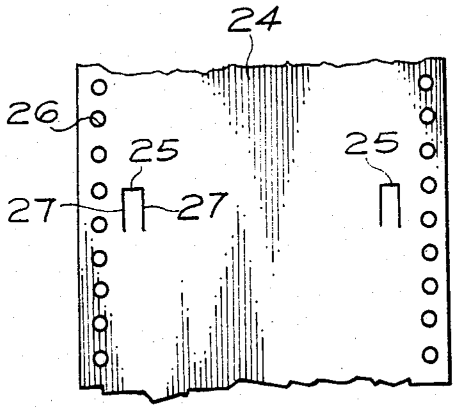
FIG. 4 is a fragmentary plan view of an endless feed belt with alignment tabs 25 as preferred for use in my system.

Drive belts 24 with sheet boundary location tabs 25 are my preferred way of advancing document and copy paper synchronously while maintaining a predetermined relationship between sheet boundaries so that copied information is properly registered. A preferred endless belt 24 as shown in FIG. 4 preferably has edge perforations 26 that correspond to the standard perforations used for computer paper tractor drives for printers. This allows standard pinwheel drives to engage and advance the endless belts and allows the belts to be made on the same machinery that make present edge perforated webs in the computer art.

Alignment tabs 25 are preferably movable from the plane of the belt so as not to form rigid abutments interfering with other components of the system. A preferred way of accomplishing this is by cutting longitudinal slits next to each tab 25 so that the tab portion 28 perpendicular to the plane of the belt 24 can move relative to the belt plane.

Figure 5:
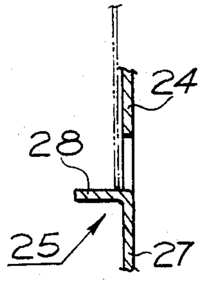
FIGS. 5 and 6 are enlarged, fragmentary cross-sectional views of alternative tabs for endless drive belts.
Figure 6:
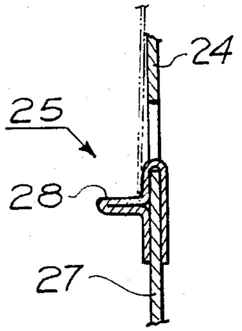

Belts 24 can be made of thin, flexible metal sheet material with tabs 25 cut and bent to form perpendicular portions 28 as shown in FIG. 5. Tabs 25 can also be formed by bending a strip of thin sheet metal to attach to a cut portion of belt 24 as shown in FIG. 6. Belts 24 can also be made of paper, fabric, and plastic or rubber materials; and tabs 25 can be formed in many ways. Preferably, the perpendicular portions 28 of tabs 25 are made thin enough so that they can be spaced every 11 inches and fit between a succession of 11 inch sheets that are practically juxtaposed at each transverse belt line occupied by tabs 25. Thin tabs 25 can also fit the perforation lines between sheets of continuous computer paper.

Figure 2:
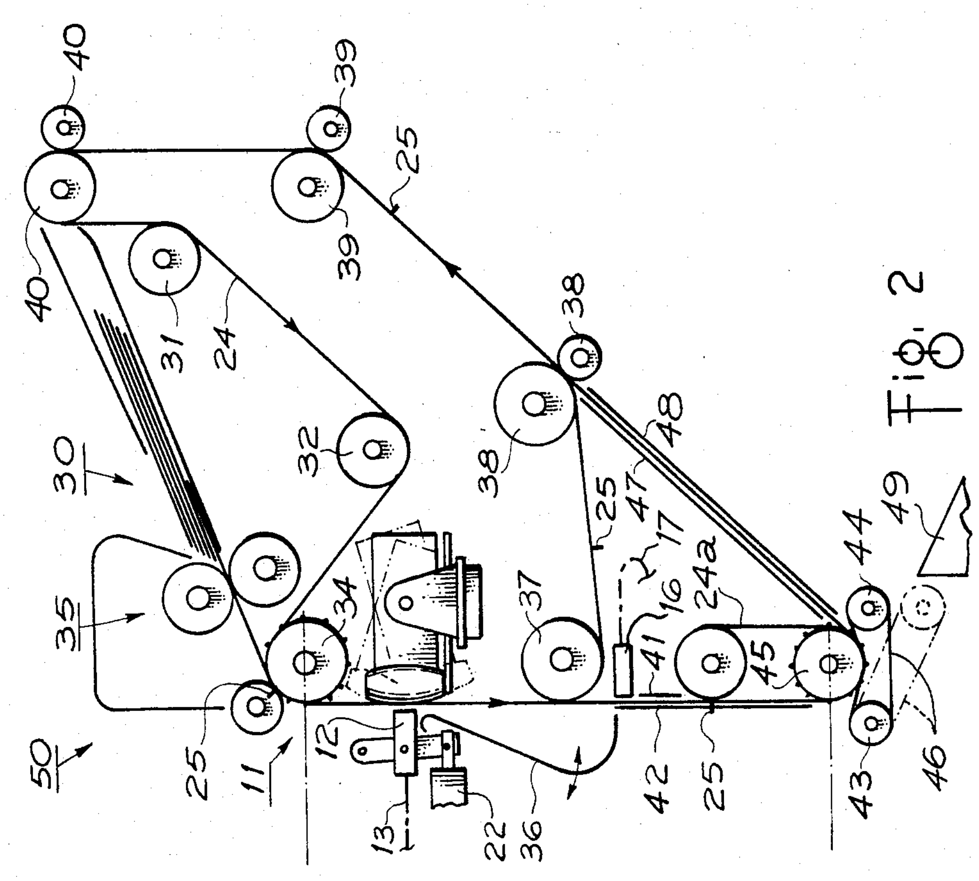
FIGS. 2 and 3 are partially schematic, respectively right and left side elevational views of my system showing preferred embodiments of an original document feed path in FIG. 2 and a copy paper feed path in FIG. 3, with interconnecting broken lines indicating common shafts.

Preferred features of an original document circulator path 50 are best shown in FIG. 2. Originals to be copied are stacked in a magazine 30 in an upper portion of circulator 50, and these are fed one at a time from the bottom of the stack by a bottom sheet feeder 35. Originals need not be discrete sheets and can be X-fold or computer paper that would not require magazine 30 and would be fed directly by feeder 35.

Endless drive belt 24 passes under idler rollers 31 and 32 spaced below magazine 30 and enters the upper portion of the original reprographic path 11 at driving pinwheel 34. Pins on wheel 34 engage edge perforations on both sides of endless belt 24 for a positive and steady advance, and wheel 34 rotates at the same speed as other drive elements for synchronizing the advance of originals and copy paper.

The operation of bottom sheet feeder 35 is also synchronized with the advance of belt 24 so that sheets fed from the bottom of a stack in magazine 30 have their leading ends positioned against spacing tabs 25 carried on belt 24. The flexibility of tabs 25 allows them to ride over idler rollers 31 and 32, and tabs 25 also offer sensible discontinuities in belt 24 so that the movement of tabs 25 can be detected and used for timing other components such as bottom sheet feeder 35.

Belt 24 then proceeds vertically downward through original reprographic path 11 in the region below driving pinwheel 34. Originals are carried downward with belt 24 in predetermined spacing provided by tabs 25.

A front reader 12 formed as an array of fiber optic lenses positioned closely adjacent originals moving downward through reprographic path 11 reads information on the front sides of the originals. A fiber optic cable 13 transmits this information instantaneously to a corresponding fiber optic lens array 14 that images the information on reprographic drum 15 alongside the copy paper path.

A solenoid 22, activated in response to detection of tabs 25, moves reader 12 away from path 11 and quickly returns reader 12 back to path 11 so that tabs 25 can pass freely by the region occupied by reader 12.

If only the fronts of originals are to be copied, the machine is programmed to close gate 36 at drive wheel 37 where belt 24 turns away from reprographic path 11. Closing gate 35 makes originals follow the path of belt 24 around drive roller 37 for a short circulation route exposing only the fronts of the originals to reader 12.

Once past drive roller 37, belt 24 proceeds to the upper end of circulation path 50 via idler rollers 38 and 39 to upper idler roller 40 where documents leave belt 24 and are restacked in collated order in magazine 30. If both sides of the originals are to be copied, then gate 36 is programmed open; and originals continue down reprographic path 11 below roller 37 where belt 24 turns. Guides 41 and 42 direct originals downward toward lower driven pinwheel 45 operating another endless belt **24*a* at the lower end of circulation path 50**.

Just below roller 37, back reader 16 reads the back sides of original documents and transmits that information via fiber optic cable 17 to corresponding fiber optic lens array 18 imaging the information on drum 19 adjacent the back side of the copy paper path.

An arrangement of idler rollers 43 and 44 carrying an endless belt 46 holds originals in contact with lower drive wheel 45 and its endless belt **24*a* so that originals round the lower corner of the long circulation path 50 and are driven up an incline between guides 47 and 48 to rejoin belt 24 at idler roller 48. The longer circulation route around lower drive wheel 45 preferably has a distance that is a multiple of 11 inches so that documents rejoining drive belt 24 come back into alignment with tabs 25. Endless belt 46 can also open as shown in broken lines to admit originals to discharge bin 49** when copying is completed.

Figure 3:
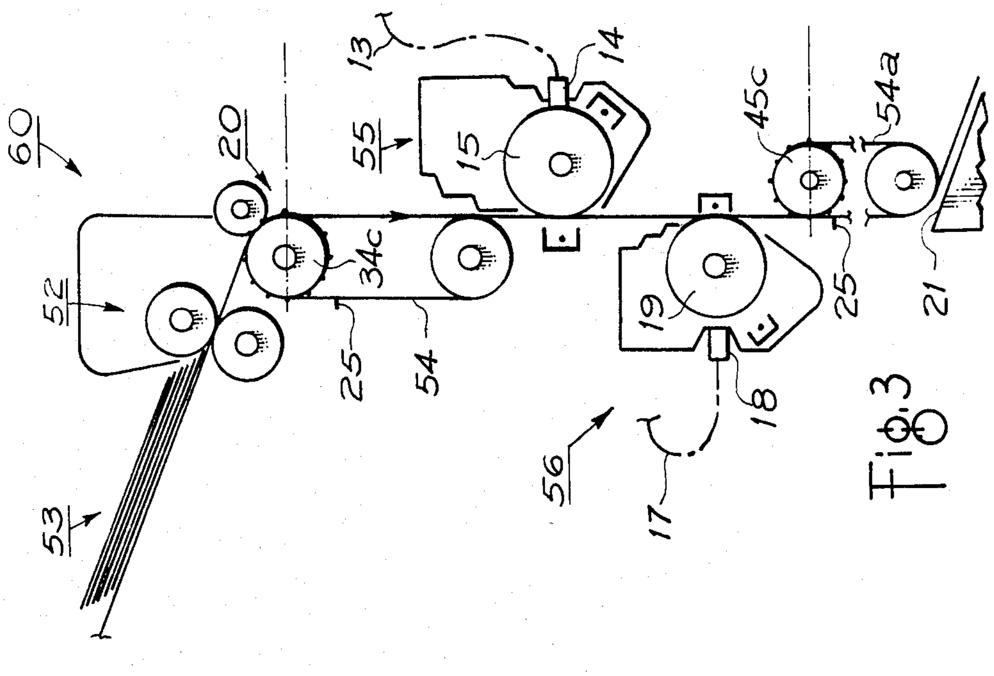

While originals are flowing in a practically unbroken succession around circulation path 50 as described above, copy paper is synchronously flowing in a similar succession along copy paper path 60 as shown in FIG. 3. The reprographic portion 20 of copy paper path 60 extends vertically downward alongside original reprographic path 11, and drive rollers for the original and copy paper paths can be interconnected, arranged on common shafts, or powered by common motors to ensure synchronous flow so that information from originals is properly registered on copy paper.

Copy paper can be zigzag or X-fold paper, perforated computer paper, or discrete sheets in a stack. Whatever paper is used, sheet edges or perforation lines between sheets of continuous paper are registered with alignment pegs 25 on drive belts 54 and **54*a* used in copy paper path 60. For standard 11 inch paper sheets, each of the drive belts 54 and 54*a* are preferably 11 inches long and carry a single set of alignment tabs 25**.

Upper copy drive belt 54 is driven by pinwheel **34*c* that is preferably coaxial with pinwheel 34 in original document path 50. Likewise, lower pinwheel 45*c* driving lower copy belt 54*a* is preferably coaxial with pinwheel 45 at the lower end of long original document path 50. Pinwheels 34*c* and 45*c* turn in accurate synchronization with corresponding pinwheels in the original document path to ensure that drive belts 54 and 54*a*** in the copy paper path move copy paper in simultaneous registration with originals.

Copy path 60 includes a front imager 55 and a rear imager 56 vertically positioned so that image information read from originals is transferred to imaging drums 15 and 19 to register the image information from original sheets onto corresponding copy sheets.

A copy paper magazine 53 at the upper end of the copy paper path supplies copy paper fed to drive belt 54 by bottom sheet feeder 52. This allows copy paper to be replenished in the middle of a run by simply stacking more copy paper on top of the diminishing supply in magazine 53.

If single side originals are being copied, the machine is programmed to deactivate back imager 56. After the information image is fixed on the front of the copy paper by front imager 55, the copy paper flows downward past lower drive belt 54a and on to finishing bench 21 where the copies are delivered in collated order ready for stapling or binding. When double-sided originals are copied, the machine is programmed to activate back imager 56 for duplex copying completed in the lower half of the reprographic copy path.

Figure 7:
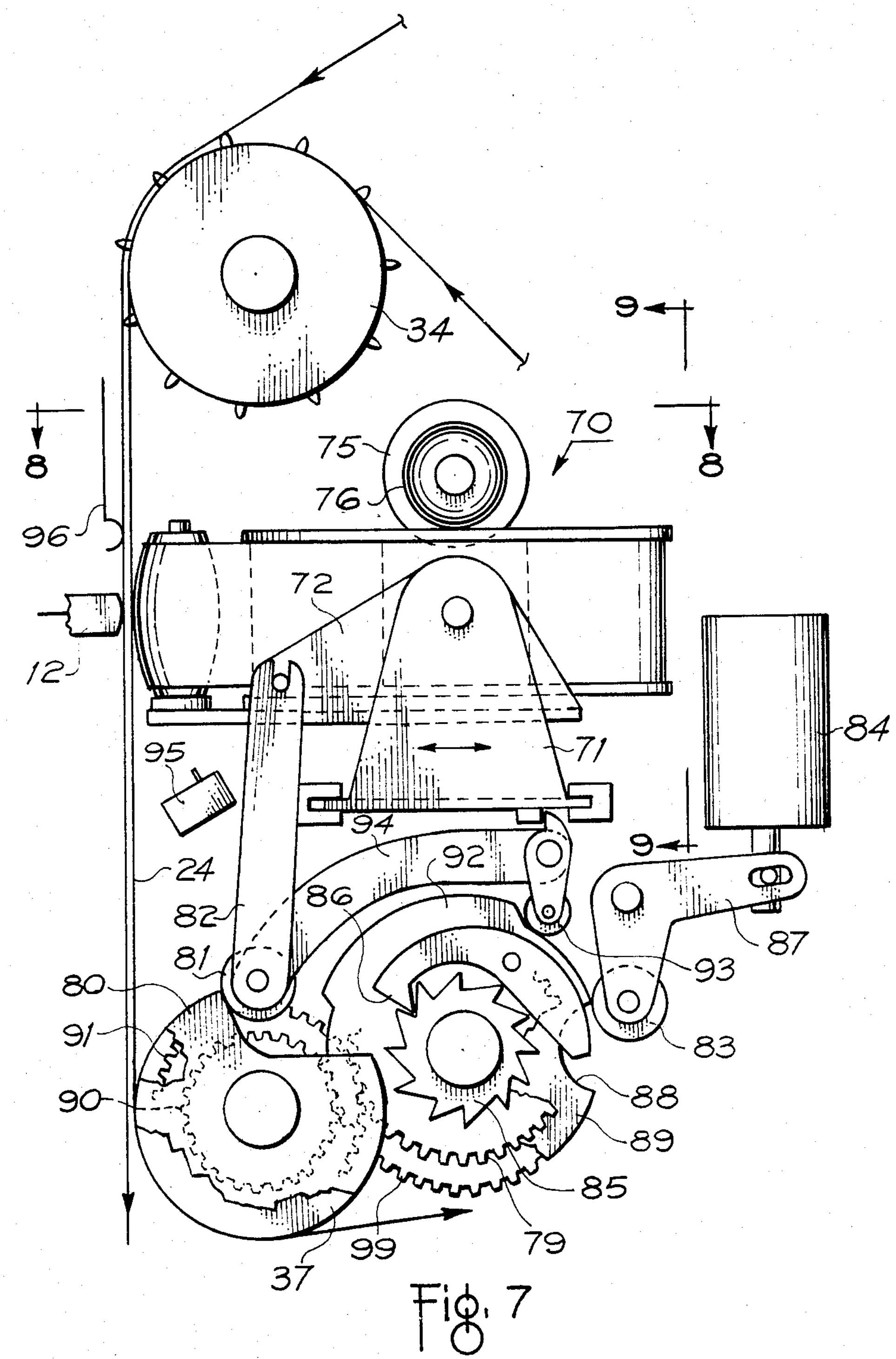
FIG. 7 is an enlarged, fragmentary, partially cutaway, side elevational view of a block information printer preferred for use in my system.
Figure 8:
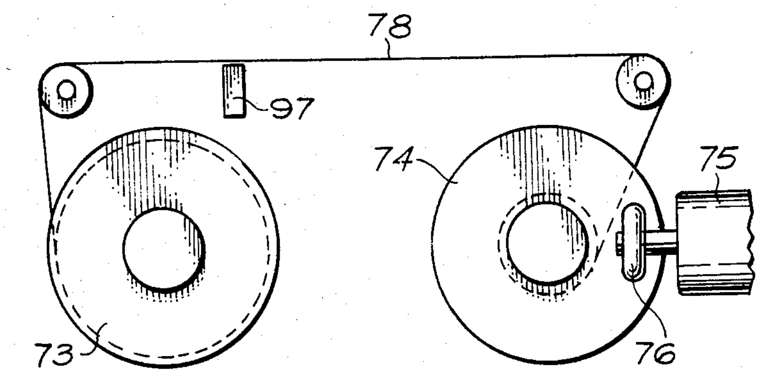
FIG. 8 is a fragmentary top view of the block information printer of FIG. 7.
Figure 9:
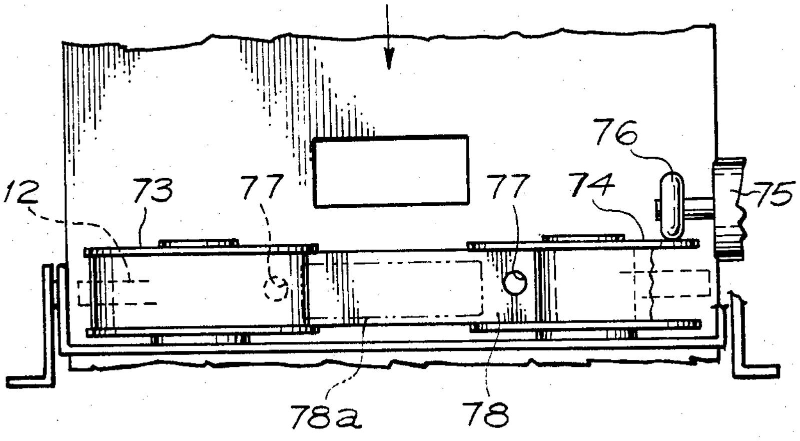
FIG. 9 is a fragmentary rear view of the block information printer of FIG. 8.

My copying and collating system can accommodate a block printer 70 such as best shown in FIGS. 7–9. Block printer 70 can be used for displaying a sequence of small information blocks to front reader 12 and moving such information blocks in synchronization with belt 24 and the original documents it carries. This can be used for supplying a sequence of different addresses in synchronization with an original letter so that as copies of the letter are made, the copies are simultaneously addressed to a series of recipients. Block printer 70 can also supply letterhead, logo, serial number, or any of a variety of relatively small sized information blocks that can be combined with a larger original document Since block printer 70 requires a clear path for displaying block information to front reader 12, belt 24 is either clear or apertured at intervals in which block printer 70 will display information. Original documents also are spaced or apertured or transparent in the region where front reader 20 reads the information displayed by block printer 70 in proper registry with the rest of the original document being copied. A sensor 96 can detect a reading aperture approaching block printer 70 and initiate an operating sequence.

Block printer 70 rocks downward in a motion synchronized with the advance of belt 24 so that block information moves past front reader 20 at the same rate as the belt advance and is copied by reader 20, which otherwise copies the balance of a corresponding original document. Block printer 70 also advances information blocks, if desired, to display a sequence of information blocks for copying. The vertical rocking motion and the information advance of block printer 70 are synchronized with other copier movement so that block information is reliably registered with original document information.

Block printer 70 includes a cradle 71 that moves toward and away from reader 12 and supports a rocking arm 72 that moves downward in synchronization with belt 24 and then retracts upward for a new cycle. Cradle 71 moves toward reader 12 on a downstroke so as to move block information closely adjacent reader 12 for copying. Then cradle 71 retracts rocker arm 72 away from reader 12 on the upstroke.

Block information 78a is prearranged on a tape 78 wound on a supply spool 73 and advanced to a take-up spool 74 by a winder motor 75 driving a friction wheel 76 engaging take-up spool 74. Registration holes 77 or other discontinuities in block message tape 78 can be sensed by a sensor 97 for stopping drive motor 75 so that each information block 78a is properly positioned laterally in a reading window through which reader 12 can copy the block information 78a on the downstroke of rocker arm 72.

A rocker cam 80 and a cam follower 81 connected to rocker arm 72 by a link 82 provides the vertical rocking motion for arm 72. Cam 80 and other cams and gears for operating block printer 70 derive motion from a drive gear 90 that rotates with roller 37 engaging drive belt 24 in the original document path. Drive gear 90 rotates continuously and meshes with ratchet gear 99, which continuously rotates ratchet 85. Whenever pawl 86 engages ratchet 85, pawl 86, stop disk 89, and other components coaxial with ratchet 85 also rotate.

An operating sequence for block printer 70 begins when start solenoid 84 actuates bell crank 87 to lift stop wheel 83 out of stop notch 88 in stop disk 89 to allow pawl 86 to engage ratchet 85. This sets pawl 86, stop disk 89, and pawl gear 79 into rotation with ratchet 85. Pawl gear 79 meshes with cam gear 91 that turns cam 80 to move follower 81 and rocker link 82.

Rotation of stop disk 89 also turns cam 92 under follower 93 that is connected to cam follower 81 and link 82 by an arm 94. Rotation for an operating cycle of block printer 70 stops when stop notch 88 in disk 89 moves back under stop wheel 83, which disengages pawl 86 from cam 85 as stop wheel 83 drops into notch 88.

As these rotations occur, rocker cam 80, follower 81, and link 82 complete a downward rocking motion of arm 72 and a return rocking motion to an upper position for arm 72. In synchronization with movement of rocker arm 72, cam 92 operates follower 93 to move cradle 71 toward reader head 12 on the downstroke and away from reader head 12 on the upstroke.

The operations of block printer 70 are readily synchronized with the advance of drive belt 24 by sensing the position of a block printing aperture or viewing window to activate start solenoid 84. Once an operating cycle commences, cradle 71 advances rocker arm 72 to dispose information tape 78 adjacent reader 12, and cam 80 rocks arm 72 downward in synchronization with the movement of a reading aperture past reader head 12 so that information on tape 78 moves past reader 12 and is copied in proper relationship to an original document.

At the bottom of the stroke of rocker arm 72, cradle 71 moves away from reader 12; and rocker arm 72 engages and closes switch 95 to activate motor 75 for advancing message tape 78 if necessary to move the next information block 78a into position for copying. The cycle completes when stop notch 88 moves under stop cam 83 and releases pawl 86 from ratchet wheel 85, whereupon block printer 70 rests until triggering of start solenoid 84 commences a new cycle.

There are other ways that block printer 70 can be arranged to work in synchronization with the advance of originals down reprographic path 11. There are also a variety of ways that the positions of originals and copying apertures can be sensed to start each cycle of block printer 70 in accurate registry with other original information moving past reader 12. Many variations are also possible in drive belts and drivers for accomplishing the original and copy paper movements necessary for my synchronous copying and collating system.

I claim:

1. A synchronous copying and collating system comprising:
   a. an original document feed path and a copy paper feed path arranged side by side;
   b. said original and copy feed paths each having reprographic portions extending vertically downward;
   c. endless drive belts with drive perforations arranged to move along said reprographic portions of each of said feed paths;
   d. pinwheel drive means for moving said endless belts simultaneously at the same speed for moving original paper and copy paper in a substantially continuous succession through each of said paths;

e. said endless drive belts having alignment pegs arranged to locate original and copy paper at predetermined regular intervals on said endless drive belts;

f. at least one fiber optic lens array arranged adjacent said original path for reading information moving down said original path;

g. reprographic means for copying information onto said copy paper moving down said copy path;

h. fiber optic means for transferring information read from said original path to said reprographic means; and i. a recirculation path for recirculating original documents through said original path.

2. The system of claim 1 wherein said alignment pegs are formed as pairs of thin elements arranged on transverse lines perpendicular to the direction of advance of said belts and equally spaced longitudinally of said belts.

3. The system of claim 2 wherein said alignment pegs are arranged to be movable relative to the feed path plane of said belts.

4. The system of claim 1 including a pair of bottom sheet feed magazines arranged respectively in said original and copy feed paths upstream of said reprographic portions of said paths.

5. The system of claim 1 wherein said original path includes a short, single side route and a long, double side route; means for switching original documents between said short and long routes; a second fiber optic lens array arranged adjacent a reprographic portion of said long route; a second reprographic means for copying information onto the obverse side of copy paper moving down said copy path; and fiber optic means for transferring information read from said second fiber optic lens array on said original path to said second reprographic means.

6. The system of claim 1 including an information block printer arranged adjacent said original path opposite said fiber optic lens array, means for moving a succession of information blocks in synchronization with said endless belt, means for allowing said fiber optic lens array to read said moving information blocks and transfer information read to said reprographic means for printing said information blocks.

7. The system of claim 6 wherein said information block moving means includes a rocking element that moves downward along said original path in synchronization with said endless belt and moves upward away from said belt, a medium bearing said succession of information blocks, and means for advancing said medium for presenting a successive one of said information blocks to said fiber optic lens array on each downward movement of said rocking element.

8. The system of claim 1 including a finishing bench arranged below said reprographic portion of said copy paper path for receiving copy paper in collated order.

9. The system of claim 1 including a discharge bin arranged below said reprographic portion of said original document path for receiving original document paper in collated order.

10. The system of claim 1 wherein said alignment pegs are formed as pairs of thin elements arranged on transverse lines perpendicular to the direction of advance of said belts and equally spaced longitudinally of said belts, and arranged to be movable relative to the feed path plane of said belts.

11. The system of claim 10 including a pair of bottom sheet feed magazines arranged respectively in said original and copy feed paths upstream of said reprographic portions of said paths.

12. The system of claim 11 including a finishing bench arranged below said reprographic portion of said copy paper path for receiving copy paper in collated order, and a discharge bin arranged below said reprographic portion of said original document path for receiving original document paper in collated order.

13. The system of claim 12 wherein said original path includes a short, single side route and a long, double side route; means for switching original documents between said short and long routes; a second fiber optic lens array arranged adjacent a reprographic portion of said long route; a second reprographic means for copying information onto the obverse side of copy paper moving down said copy path; and fiber optic means for transferring information read from said second fiber optic lens array on said original path to said second reprographic means.

14. The system of claim 13 including an information block printer arranged adjacent said original path opposite said fiber optic lens array, means for moving a succession of information blocks in synchronization with said endless belt, means for allowing said fiber optic lens array to read said moving information blocks and transfer information read to said reprographic means for printing said information blocks.

15. The system of claim 14 wherein said information block moving means includes a rocking element that moves downward along said original path in synchronization with said endless belt and moves upward away from said belt, a medium bearing said succession of information blocks, and means for advancing said medium for presenting a successive one of said information blocks to said fiber optic lens array on each downward movement of said rocking element.

* * * * *